(12) United States Patent
DiFrank

(10) Patent No.: US 6,286,339 B1
(45) Date of Patent: Sep. 11, 2001

(54) GLASS CONTAINER FORMING MACHINE PLUNGER ASSEMBLY

(75) Inventor: Frank J. DiFrank, Toledo, OH (US)

(73) Assignee: Owens-Brockway Glass Container Inc., Toledo, OH (US)

( * ) Notice: Subject to any disclaimer, the term of this patent is extended or adjusted under 35 U.S.C. 154(b) by 0 days.

(21) Appl. No.: 09/493,554

(22) Filed: Jan. 28, 2000

(51) Int. Cl.[7] .................................................. C03B 11/06
(52) U.S. Cl. .................. 65/362; 65/319; 65/226; 65/356; 65/308; 425/193; 425/468; 425/469
(58) Field of Search ............................ 65/319, 356, 362, 65/226, 308; 425/193, 468, 469

(56) References Cited

U.S. PATENT DOCUMENTS

| | | |
|---|---|---|
| 3,314,775 | 4/1967 | Shetler et al. . |
| 4,033,744 | 7/1977 | Davis . |
| 4,636,240 | 1/1987 | Kozora . |
| 5,037,465 | 8/1991 | Moore . |
| 5,078,769 | 1/1992 | Trier . |
| 5,120,341 | 6/1992 | Nozawa et al. . |
| 5,290,335 | 3/1994 | Stewart . |
| 5,366,528 | * 11/1994 | Mann ..................................... 65/362 |
| 5,531,804 | 7/1996 | Vajda . |
| 5,707,414 | 1/1998 | Leidy . |

* cited by examiner

Primary Examiner—Michael P. Colaianni

(57) ABSTRACT

A plunger assembly (10) for a glass container forming machine of the I.S. type, the plunger assembly having a plunger (12) that is open it one end and is non-threadably secured at its open end to a free end of an annular cylinder rod (14) that operates to reciprocate the plunger relative to a blank mold of the forming machine. A perforated cooling air inlet tube (20) is positioned within the plunger, and the free end of the air inlet tube is held against a free end of an annular extension (22) of the cylinder rod, an opposed end of which is threadably received in the cylinder rod, by a split locking ring (30) an inwardly facing recess (36, 38) of which traps a radially outwardly extending flange (40) of the plunger to axially position the plunger relative to the split ring. The split ring abuts an endless ring (24) and is axially positioned thereagainst by a flange (44, 46) of the split ring that is received in a recess (42) of the extension. Cooling air flows into the cooling air inlet tube through the cylinder rod and the extension and exit from the plunger through apertures (54) in the split ring, an annular cavity (76) in the endless ring, openings (52) in the endless ring, openings (78) in the sleeve, an annulus (18) between the cylinder rod and the sleeve and an annulus (48) at the base of the sleeve.

6 Claims, 3 Drawing Sheets

GLASS CONTAINER FORMING MACHINE PLUNGER ASSEMBLY

BACKGROUND OF THE INVENTION

1. Field of the Invention

This invention relates to a plunger assembly of the type used in a glass container forming machine of the individual section (I.S.) type when used to produce containers according to the narrow neck press and blow (NNPB) process.

2. Description of the Prior Art

Production of glass containers on an I.S. machine by the NNPB process is generally described in U.S. Pat. No. 5,707,414 (Leidy), which is assigned to the assignee of this application, the disclosure of which is incorporated by reference herein. In conventional NNPB glass container manufacturing, container preforms, which are often called parisons or blanks, are formed from gobs of molten glass in blank molds of an I.S. machine by pressing, by a reciprocating plunger that is powered by a pneumatic cylinder, and this process, conventionally, requires that the plunger and cylinder rod elements of the plunger assembly be separate pieces. These separate pieces conventionally are removably joined to one another by a specially designed threaded fastener that is used to join plunger and cylinder rod clips to one another. Such threaded fasteners, when new, tend to work loose, and, when old, tend to fuse to one another by rusting that occurs in the inherently high temperature environment of a glass container forming machine. Further, a typical plunger is internally air cooled by way of an air inlet pipe that extends into the plunger through the plunger cylinder rod, and this air inlet pipe is subject to breakage in use in the region of the free or distal end of the plunger because of misalignment that can occur in service between the plunger and the plunger cylinder.

The misalignment of the plunger and the air inlet tube contained therein can also lead to contact between the tip of the air inlet tube and the inside of the plunger, and this can lead to an undesirable non-uniform temperature condition on the interior of the plunger.

An alternative glass container forming machine plunger assembly is described in U.S. Pat. No. 3,314,775 (DeShetler et al.), which was assigned to a predecessor of the assignee of the present invention, the disclosure of which is also incorporated by reference herein.

SUMMARY OF THE INVENTION

The aforesaid and other problems associated with prior art pneumatically actuated glass container parison plunger assemblies is overcome by the plunger assembly according to the present invention in which the plunger to cylinder connection permits the plunger to float freely relative to the cylinder rod to which it is removably secured, a factor that reduces plunger cooling tube breakage and helps to maintain plunger surface temperature uniformity; this factor also reduces the time involved in changing a plunger in such a plunger assembly. These results are obtained by connecting the plunger to the cylinder rod by a split locking ring with an inwardly extending flange at an end that engages an outwardly extending flange of the plunger. The split ring is aligned, at its other end, but is not connected to, an endless ring which has an inwardly extending flange that engages an outwardly extending flange of an extension of the cylinder rod, and the cylinder rod extension has an internally threaded free end that is threadably received in the cylinder rod of the plunger assembly. The plunger air inlet tube floats within the plunger, but is maintained in alignment with the extension to the cylinder rod, by the engagement of the plunger by the split ring. The split ring has a series of openings passing therethrough, and these openings are aligned with corresponding openings in the fixed ring. In the normal operating positions of the plunger, the split locking ring is always surrounded by an annular sleeve to keep the locking ring segments from separating; however, to change a plunger, the plunger cylinder is advanced to move the split locking ring to a position external to the annular sleeve, to thereby permit the locking ring segments to be separated, without the need for any-special tool, and thereby remove the plunger from engagement with the cylinder rod. A cooling air seal is formed between the endless ring and the split locking ring thereabove by an O-ring contained in an annular groove of the endless ring, at a location radially inwardly of the openings in the fixed ring and in alignment with an annular surface of the split ring when the segments of the split ring are closed. At this location, the O-ring expands when heated, which increases its sealing effectiveness.

Accordingly, it is an object of the present invention to provide an improved glass container forming machine plunger assembly. More specifically, it is an object of the present invention to provide an assembly of the foregoing character in which a plunger element may be readily disconnected from the cylinder element to which it is connected in service, and without the requirement for any special tool, to facilitate replacement of a plunger.

For a further understanding of the present invention and the objects thereof, attention is directed to the drawing and the following brief description thereof; to the detailed description of the preferred embodiment and to the appended claims.

DETAILED DESCRIPTION OF THE PREFERRED EMBODIMENT

Figure 1:
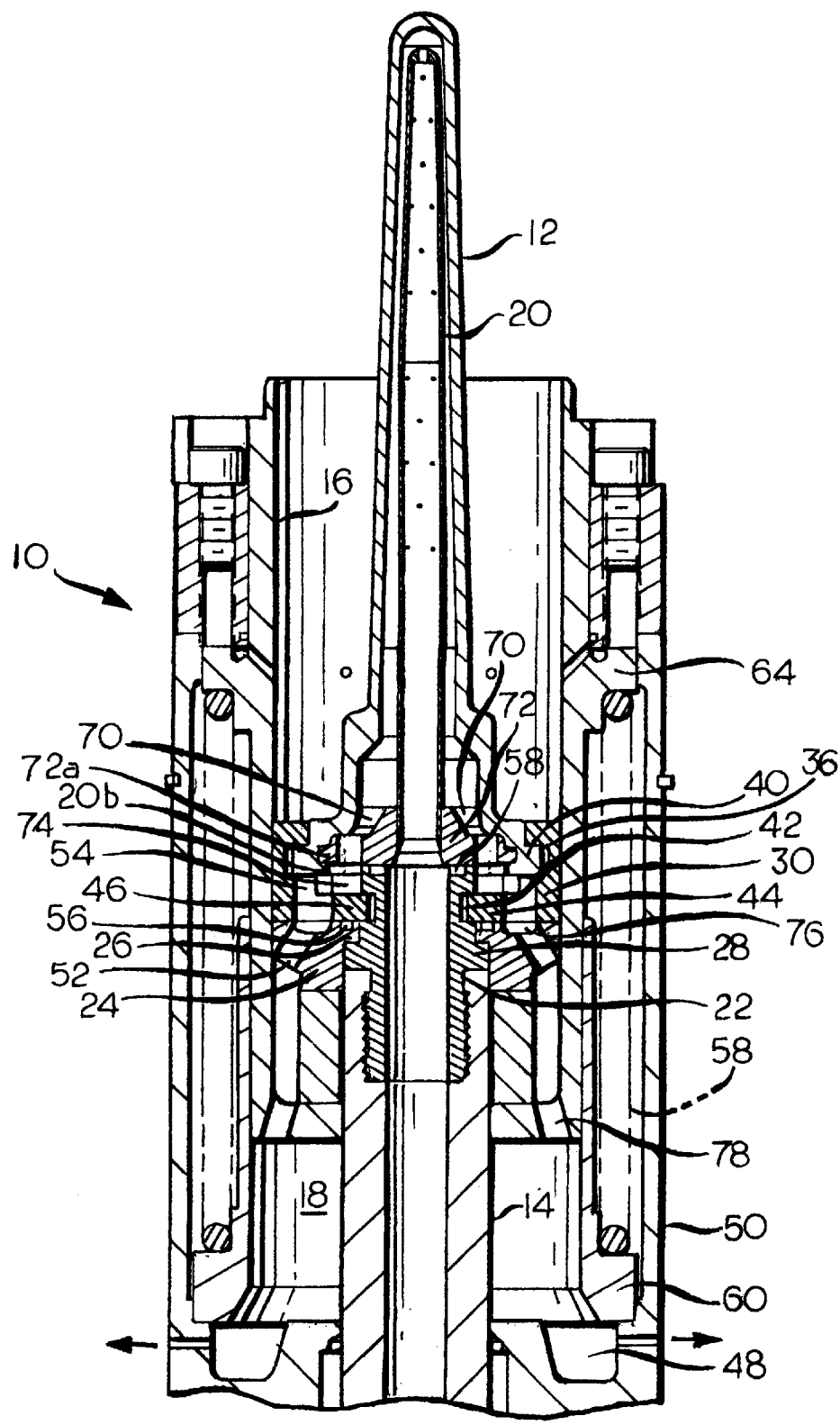
FIG. 1 is a fragmentary elevational view, in cross section, of a plunger assembly according to the preferred embodiment of the present invention at a position that the elements of such assembly occupy during the normal operation of the assembly.

A plunger assembly according to the preferred embodiment of the present invention is generally illustrated by the reference numeral 10. The plunger assembly 10 has a plunger 12, which is open at one end, and an annular rod 14 of a pneumatic cylinder or other prime mover. The open end of the plunger 12 is removably secured to an end of the rod 14. The rod 14 reciprocates within an annular sleeve 16, the interior of which defines an annulus 18 with the exterior of the rod 14. The rod 12 reciprocates relative to a blank mold (not shown) of an I.S. glass container forming machine to press gobs of molten glass into preforms, often called parisons or blanks; consequently, the plunger 12 is always operating in a high temperature environment. To keep the plunger 12 from overheating during service, a perforated cooling air inlet tube 20 is positioned within the plunger 12, extending from the open end of the plunger 12 to nearly its opposed end, to continuously discharge cooling air into the interior of the plunger 12.

The air inlet tube 20 is in engagement with an annular surface at an end of an annular extension 22 to the cylinder rod 14, and the opposed end of cylinder rod extension 22 is threadably received in the interior of a free end of the cylinder rod 14. The exterior of the free end of the cylinder rod 14 is surrounded by an endless or annular ring 24, and the annular ring 24 has an inwardly projecting flange 26 that seats against an outwardly projecting flange 28 of the cylinder rod extension 22 to accurately axially position the annular ring 24 relative to the cylinder rod extension.

A split locking ring 30 with semi-cylindrical segments 32, 34 disposed end to end during normal operation of the plunger assembly 10 is positioned in axial alignment with the annular ring 24. The segments 32, 34 have radially inwardly facing recesses 36, 38, respectively, and the recesses 36, 38 engage a radially outwardly projecting shoulder 40 at an inlet of the plunger 12 to accurately axially position the plunger 12 relative to the cylinder rod 14 when the segments 32, 34 are disposed in end to end relationship, as they will be at all times during normal operation of the plunger assembly 10 because of the presence of the sleeve 16. However, to change a plunger 12, the cylinder rod 14 is advanced to move the split ring 30 beyond the outer limits of the sleeve 16, whereupon the segments 32, 34 can be freely separated from one another to permit the plunger 12 to be removed from the cylinder rod 14. The split ring 30 is also maintained in accurate axial position relative to the cylinder rod during normal operation of the plunger assembly 10 by providing the cylinder rod extension 22 with an outwardly facing recess 42 and by providing the segments 32, 34 with inwardly facing flanges 44, 46, respectively, that are received in the recess 42 when the segments 32, 34 are disposed in end to end relationship to one another.

Figure 2:
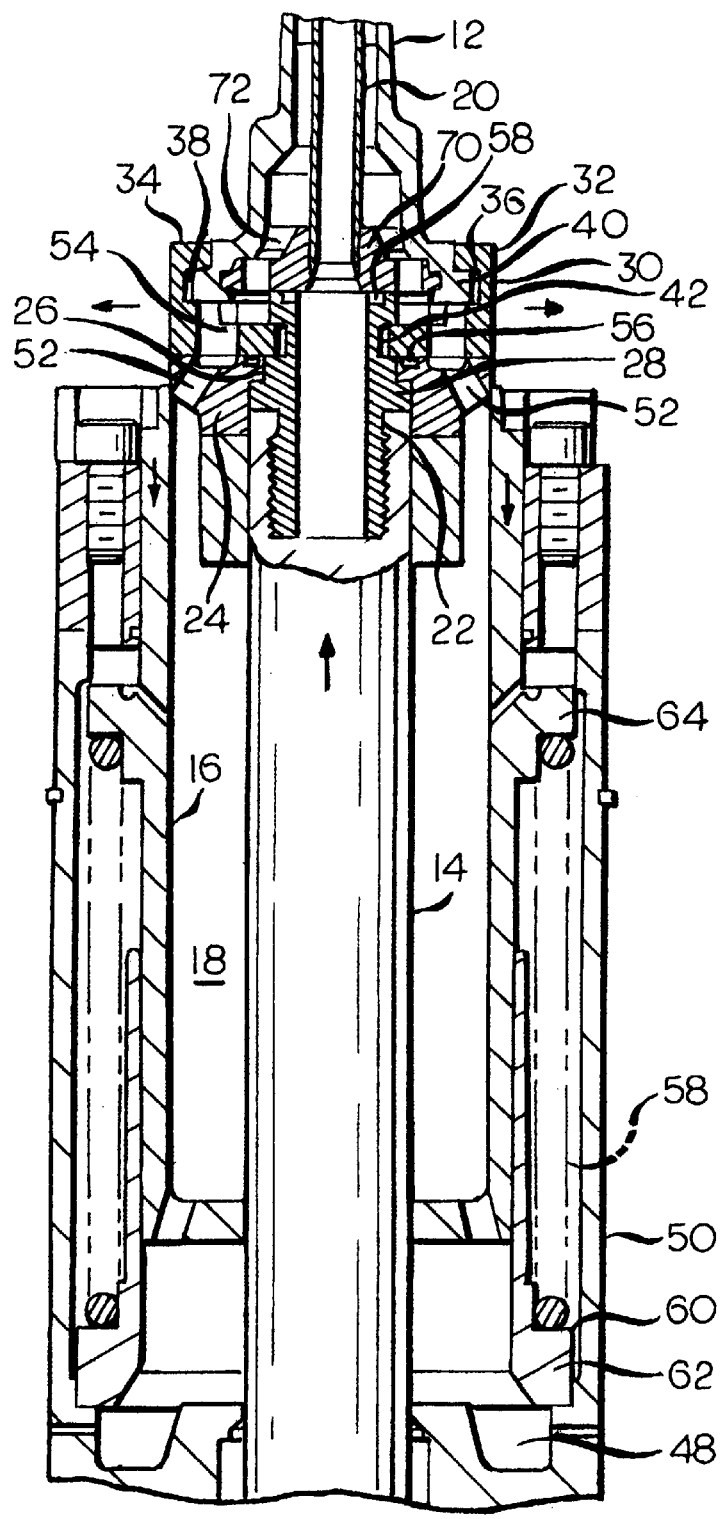
FIG. 2 is a view like FIG. 1 illustrating the positions of the elements of the assembly of FIG. 1 at a time when a plunger element of the assembly is in a position to be replaced.
Figure 3:
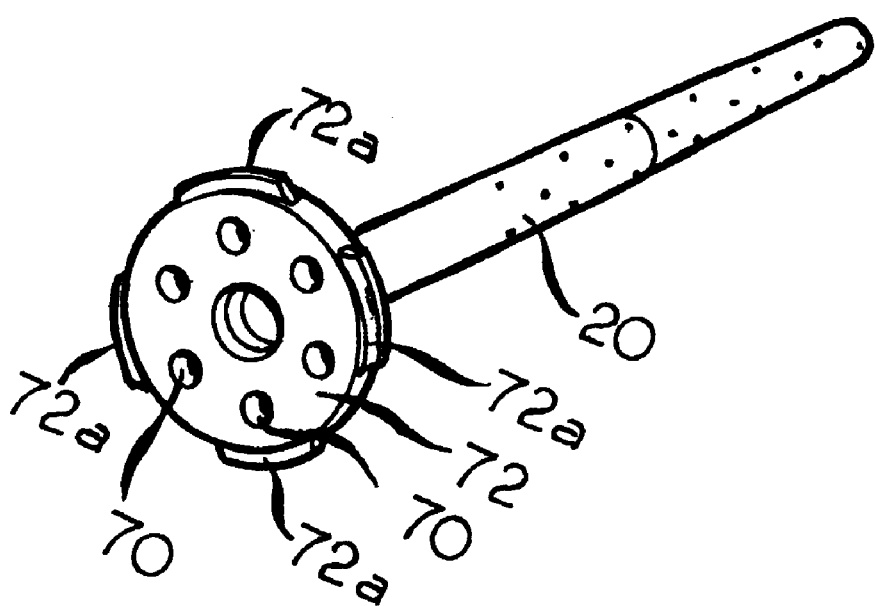
FIG. 3 is a three-dimensional view of an element of the plunger assembly of FIGS. 1 and 2.

Cooling air flows upwardly, in the orientation depicted in FIGS. 1 and 2, through the cylinder rod 14 and the cylinder rod extension 22 into the perforated air inlet tube 20, from which it flows outwardly through the perforations therein to cool the interior of the plunger 12. The cooling air then flows downwardly in the space between the plunger 12 and the air inlet tube 20 to exit through openings 70 in an annular base 72 at an opposed end of the air inlet tube 20, the openings 70 being arranged in a circumferentially spaced array of individual openings. The air then flows through an annular cavity 74 that is formed by the segments 32, 34, and from the cavity 74 the air then flows through openings 54 in the inwardly facing flanges 44, 46 of the segments 32, 34. The air then flows into an annular cavity 76 in the endless ring 24 from which it exits through openings 24 in the endless ring 52, the openings 52 being arranged in a circumferential array of individual openings. The air then flows into the annulus 18, through openings 78 in the sleeve 16, and then into an annulus 48 at the base of the sleeve 16, from which it is vented to atmosphere.

The escaping air from the plunger 12 is now at an elevated temperature, for example, a temperature of the order of 400° F., and the metal elements of the plunger assembly are now substantially expanded. However, the expanded elements must still have sufficient play to accommodate misalignment of the air inlet tube 20 relative to the cylinder rod 14. This misalignment is frictionally accommodated by an O-ring in an annular recess 58 of a face at the end of the cylinder rod tube 14 that is engaged by an annular surface of the annular base 72 of the cooling air inlet tube, this arrangement permitting the cooling air inlet tube to move radially with respect to the cylinder rod 14. Further, frictional radial movement of the segments 32, 34 relative to the annular ring 24 is permitted by an O-ring in a annulus 56 in a face of the annular ring 24 that is engaged by the flanges 44, 46 of the segments 32, 34.

Any shock loads that may be encountered by the plunger assembly 10 in its normal operation are absorbed by a compression spring 58 that is trapped between an annular shoulder 60 of an annular sleeve 62 of the plunger assembly 10 that slidably surrounds the sleeve 16 and an annular shoulder 64 of the sleeve.

The annular base 72 of cooling air tube 20 has a circumferentially spaced apart plurality of radially outwardly extending tabs 72a, and the plunger 14 is provided with a flange 14a that has a plurality of circumferentially spaced apart plurality of radially inwardly extending tabs 14b. The cooling air tube 20, then, may be rapidly removably secured within the plunger by an insert and turn motion, to bring the annular base 72 into engagement with the flange 14a and to bring the tabs 72a and 14b into overlapping relationship with one another. Preferably the tabs 72a and 14b have tapered faces that engage one another to frictionally, but smoothly, secure the cooling air tube 20 and the plunger 14 to one another.

Although the best mode contemplated by the inventor for carrying out the present invention as of the filing date hereof has been shown and described herein, it will be apparent to those skilled in the art that suitable modifications, variations and equivalents may be made without departing from the scope of the invention, such scope being limited solely by the terms of the following claims and the legal equivalents thereof.

What is claimed is:

1. A plunger assembly for pressing gobs of glass into hollow articles, said plunger assembly comprising:

prime mover means having an elongate member with a free end for imparting reciprocating motion to a plunger;

a plunger non-threadably engaging said free end of said elongate member;

an annular collar surrounding said free end of said elongate member said annular collar being fixedly position with respect to a longitudinal central axis of said elongate member; and a split ring joined end to end and being fixedly positioned with respect to said plunger and said elongate member along said longitudinal central axis of said elongate member;

wherein said split ring comprises first and second semi-cylindrical segments and said first and second semi-cylindrical segments are joined end to end during normal operation of said plunger assembly, and further comprising:

an annular sleeve surrounding said split ring during normal operation of said plunger assembly to prevent separation of said first and second semi-cylindrical segments, said plunger of said plunger assembly reciprocating within said annular sleeve during normal operation and being movable relative to said annular sleeve to a position where said annular sleeve does not surround said split ring, whereby said first and second semi-cylindrical segments of said split ring may be separated from one another to permit said plunger to be removed from said elongate member during a plunger changing operation.

2. A plunger assembly according to claim 1 wherein said elongate member is annular in configuration, and further comprising:

a perforated cooling air inlet tube positioned within said plunger, said cooling air inlet tube having an air inlet end with an outwardly extending flange at said air inlet end, said cooling air inlet tube being adapted to receive cooling air from said elongate member; and wherein said split ring has an inwardly facing recess, said inwardly facing recess engaging said outwardly extending flange of said air inlet tube when said first and second segments of said split ring are joined end to end to accurately axially position said air inlet tube and said split ring relative to one another.

3. A plunger assembly according to claim 2 and further comprising:

an annular extension, an end of said extension being threadably joined to said free end of said elongate member, said cooling air inlet tube non-threadably engaging an opposed end of said extension and being adapted to receive cooling air from said elongate member by way of said extension, said extension having an outwardly facing recess; and wherein said split ring has an inwardly extending flange, said inwardly extending flange of said split ring being received in said outwardly facing recess of said extension when said first and second segments of said split ring are joined end to end to accurately axially position said extension and said split ring relative to one another.

4. A plunger assembly according to claim 3 wherein said elongate member of said prime mover and said annular sleeve define an annulus, wherein said annular collar comprises passage means extending therethrough, and wherein said split ring comprises passage means extending therethrough, said passage means in said annular sleeve being in communication with said passage means in said split ring and with said annulus, spent cooling air from said plunger being adapted into exit said plunger assembly by flowing through said passage means of said split ring, said passage means of said annular collar and said annulus.

5. A plunger assembly according to claim 2 and further comprising:

means for releasably joining said plunger and said cooling air inlet tube to one another by an insert and turn motion.

6. A plunger assembly according to claim 3 wherein said cooling air inlet tube has an annular base, a radial surface of said annular base of said cooling air inlet tube frictionally slidably engaging a radial surface of said annular extension.

\* \* \* \* \*